United States Patent [19]

Dawes

[11] 3,828,807
[45] Aug. 13, 1974

[54] PRESSURE REGULATOR
[75] Inventor: Michael H. Dawes, Rexford, N.Y.
[73] Assignee: Chandler Evans Inc., West Hartford, Conn.
[22] Filed: Aug. 13, 1973
[21] Appl. No.: 388,028

[52] U.S. Cl............ 137/495, 137/269, 137/505.14, 137/505.18
[51] Int. Cl............................................. F16k 31/14
[58] Field of Search . 137/269, 495, 505.18, 505.14, 137/505.15, 505.27, 505.28

[56] References Cited
UNITED STATES PATENTS
| | | | |
|---|---|---|---|
| 905,188 | 12/1908 | Hulse | 137/505.22 |
| 2,865,395 | 12/1958 | Fields | 137/495 X |
| 3,179,123 | 4/1965 | Kowalski | 137/505.18 X |
| 3,433,262 | 3/1969 | Ray | 137/505.18 X |
| 3,481,363 | 12/1969 | Ray | 137/495 |

Primary Examiner—Harold W. Weakley

[57] ABSTRACT

A regulator device which will selectively regulate about one of two pressure levels is disclosed. The regulator device includes a regulator poppet which defines two pressure sensing areas and a solenoid actuated valve for controlling application of the regulated pressure to either one or both sensing areas to selectively establish, in cooperation with a biasing spring, balanced positions of the poppet commensurate with the two pressure levels. The poppet is disposed in a valve housing and cooperates therewith to modulate the flow from a pressurized fluid source to the region wherein the pressure level is to be regulated.

10 Claims, 1 Drawing Figure

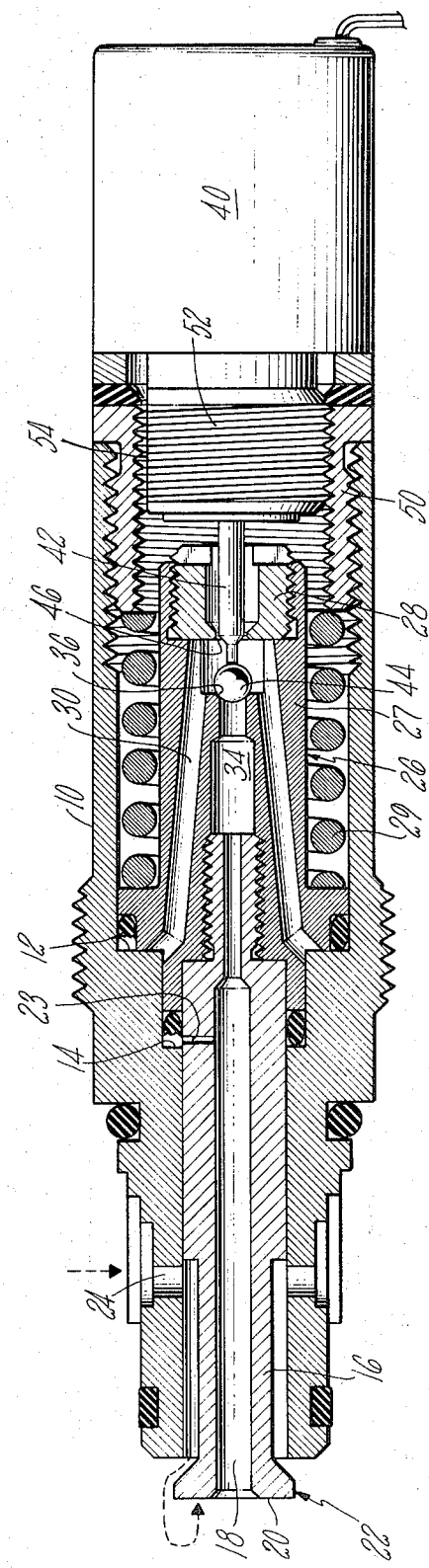

PRESSURE REGULATOR

BACKGROUND OF THE INVENTION

1. Field of the Invention

The present invention relates to the control of fluidic pressure. More specifically, this invention is directed to apparatus which will regulate a monitored pressure about a selected one of two predetermined pressure levels. Accordingly, the general objects of the present invention are to provide novel and improved methods and apparatus of such character.

2. Description of the Prior Art

Pressure regulators are, of course, widely used and devices which will maintain a single preselected pressure within an enclosure or at the upstream side of a fluid consuming load are well known in the art. There are numerous instances where the pressure to be regulated must be varied between two preselected levels commensurate with the operating conditions of a fluidic system. In the prior art, when regulation about a selected one of two pressure levels was desired, it was conventional practice to employ a pair of regulators and means for selectively enabling and disabling the two regulation devices. Thus, when it has previously been desired to achieve two level pressure regulation, at least three separate devices have been required.

The necessity of employing a plurality of devices to accomplish the function of two level pressure regulation is, of course, contrary to most design objectives. This is particularly true in aerospace applications where compactness and minimization of the number of moving parts are of critical importance.

SUMMARY OF THE INVENTION

The present invention overcomes the above briefly discussed and other deficiencies and disadvantages of the prior art by providing a single device which will selectively regulate about one of two pressure levels. Apparatus in accordance with the present invention is characterized by two available pressure sensing areas on a regulating valve member. A solenoid actuated valve is employed to control application of the regulated pressure; i.e., the pressure to be sensed; to either one or both of the sensing areas. The energization state of the solenoid is thus commensurate with which one of two pressure levels will be maintained by the device; the pressure regulation function being accomplished by modulating the flow from a pressurized fluid source to the enclosure or load of interest by means of moving the regulating valve member.

BRIEF DESCRIPTION OF THE DRAWING

The present invention may be better understood and its numerous objects and advantages will become apparent to those skilled in the art by reference to the accompanying drawing which is a side elevation view, partly in section, of a preferred embodiment of the invention.

DESCRIPTION OF THE PREFERRED EMBODIMENT

With reference now to the drawing, a pressure regulator in accordance with the invention includes a main body portion 10 which defines, by means of stop shoulders 12 and 14 a stepped cylinder. The stem portion 16 of a regulator poppet is disposed for movement in the cylinder in body 10.

Stem portion 16 is provided, at a first end 20, with an enlarged valve member portion indicated generally at 22. The frustoconical inwardly disposed wall of valve member portion 22 is juxtapositioned to the end of body 10 and cooperates with housing 10 to define a passage for the flow of pressurized fluid from a source, not shown, connected to supply port 24 of housing 10. Reciprocating motion of valve stem 16, controlled in the manner to be described below, varies the area of the passage defined between valve member portion 22 and the cooperating end of housing 10 to thereby regulate the downstream pressure by modulating the flow through the device.

Stem portion 16 of the regulator poppet is also provided with an axial passage 18 extending the entire length thereof between end 20 and a second oppositely disposed end. Stem portion 16 further defines a radial passage 23 oriented generally transversely with respect to axial passage 18. Passage 23 provides communication between passage 18 and a "high pressure" sensing area defined by shoulder 14 on body 10.

The regulator poppet stem portion 16 is mechanically connected to a poppet extension indicated generally at 26. Extension 26 includes a pressure sampling portion 27 and, mounted at the end thereof, an ambient seat defining portion 28. Extension 26, and thus the entire poppet assembly, is biased to the left in the disclosed embodiment by a regulating spring 29. Portion 27 of extension 26 is provided with "low pressure" sensing volume connecting passages 30 which terminate at low pressure level sensing areas defined by shoulder 12 of body 10. Extension 26 is also provided with an axial passage which is aligned with and thus in fluid communication with passage 18 in stem portion 16. The axial passage in sampling portion 27 of extension 26 defines a controlled pressure sampling volume 34 and, at the free end of portion 27, a first or "pressure" seat 36 for a solenoid operated ball valve.

The pressure to which the present invention will regulate is selected, in the manner to be described below, by means of the above mentioned solenoid operated ball valve. The solenoid for this valve is indicated at 40, the valve plunger at 42 and the valve member or ball at 44. The solenoid valve plunger is spring loaded whereby the ball 44 is normally urged against the "pressure" seat 36 as shown. Under these conditions the low pressure sensing volume of the device is vented to the ambient atmosphere via a second or "ambient" ball valve seat 46 defined by portion 28 of extension 26; seat 46 being disposed oppositely to seat 36. The solenoid assembly of the ball valve is mechanically connected to housing 10 via an intermediate member 50. Either member 50 or the forward portion 52 of the solenoid housing may be provided with one or more flats 54 which provide fluid communication between "ambient" seat 46 and the exterior of housing 10.

In the absence of an electrical signal to solenoid 40, as previously noted above, the solenoid spring extends plunger 42 pressing ball 44 against the "pressure" seat 36. The regulated pressure is, under these conditions, applied to the "high" pressure level sensing area defined by shoulder 14 via passages 18 and 23. The regulated pressure may also or alternately act upon end 20 of stem portion 16. The application of the regulated pressure to shoulder 14 and surface 20 creates, in the disclosed embodiment, a closing force on the regulator poppet which is balanced by the regulating spring 29. The valve stem portion 16 will thus achieve a first desired pressure by moving so as to modulate flow through the valve defined by the end of housing 10 and the valve member portion 22 at the end of stem portion 16.

When an electrical signal is applied to solenoid 40 the plunger 42 will retract. When plunger 42 retracts the monitored pressure will urge the ball 40 against the ambient seat 46 thereby permitting the regulated pressure to reach the "low" pressure additional sensing area 12 via passages 30. Since essentially the same force is required to balance the spring force, a lower pressure on the larger area as defined by both the high and low pressure level sensing areas will achieve the balance and the device will thus regulate pressure about a second and lower pressure by modulating flow in the same manner as described above.

Upon deenergization of solenoid 40 the spring loaded plunger will again seat ball 44 against "pressure" seat 36 and, in the manner previously described, the low pressure additional sensing volume will be vented to the exterior of housing 10. Accordingly, the pressure regulator will resume regulating about the first or higher pressure as defined by the high pressure sensing areas 14 and 20 and regulating spring 29.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A pressure regulator comprising:

housing means, said housing means defining an elongated stepped bore having at least first and second shoulders oriented generally transverse to the axis of the bore;

regulating valve actuator means disposed for movement in said housing means bore, said actuator means having a shape generally complementary to the shape of said bore whereby first and second pressure sensing areas respectively facing said housing means first and second shoulders are defined;

regulating valve means for controlling the delivery of pressurized fluid from a fluid source to a load;

means connecting said actuator means to said valve means whereby the load pressure will be varied in accordance with the position of said actuator means;

means for biasing said actuator means in a first direction;

means applying the load pressure to a first of said pressure sensing areas, the forces generated by fluid pressure acting on said actuator means first pressure sensing area cooperating with said biasing means to achieve a first balanced condition wherein the position of said actuator means will be adjusted to establish a condition of said valve means commensurate with a first load pressure;

means including a remotely controlled valve for selectively applying the pressure at said first pressure sensing area of said actuator means to said actuator means second pressure sensing area, the forces generated by fluid pressure acting on said actuator means second pressure sensing area and cooperating with the forces resulting from pressure applied to said first pressure sensing area and with said biasing means to establish a second balanced condition of said actuator means commensurate with a second load pressure; and means for venting pressure from said second sensing area when said remotely controlled valve is in a second state.

2. The apparatus of claim 1 wherein said means for selectively applying pressure comprises:

a first passage extending through said actuator means from said load pressure applying means to an end thereof, said end of said actuator means defining a valve seat about the periphery of said first passage;

solenoid operated valve means, said solenoid operated valve means including a valve element which cooperates with the seat defined at the end of said regulating valve means to perform a valving function; and means providing fluid communication between the region between said housing means second shoulder and said adjusting means second pressure sensing area and a point downstream of said adjusting means valve seat defining end.

3. The apparatus of claim 2 wherein said venting means comprises:

means defining a vent passage between said fluid communication providing means and the exterior of said housing means, said vent passage defining means having a valve seat defining upstream end which cooperates with the valve element of said solenoid operated valve means to perform a valving function.

4. The apparatus of claim 1 wherein said biasing means acts in opposition to the pressure forces developed at said regulating valve means first and second pressure sensing areas.

5. The apparatus of claim 3 wherein said biasing means acts in opposition to the pressure forces developed at said regulating valve means first and second pressure sensing areas.

6. The apparatus of claim 5 wherein said housing means bore communicates with the exterior of said housing and wherein said regulator further comprises:

means for coupling a source of pressurized fluid to said housing means bore, the fluid being delivered to the load via said bore.

7. The apparatus of claim 5 wherein said adjusting means comprises:

poppet stem means, a first diameter portion of said stem means being connected to an intermediate portion thereof which defines said first pressure sensing area, said intermediate portion of said stem means being connected to a third portion thereof, said third stem means portion defining said second pressure sensing area, said stem means having said first passage extending therethrough and;

wherein said load pressure applying means includes:

a second passage in said stem means first portion, said second passage establishing continuous communication between the end of said stem means and the region between said first shoulder and first pressure sensing area.

8. The apparatus of claim 7 wherein said regulating valve means comprises:
a valve element, said valve element being mechanically connected to the free end of said stem means first portion by said connecting means, said valve element extending out of said housing means bore and having a contoured surface which cooperates with said housing means at the end of said bore to perform a regulating valve function, said valve element having a passage therethrough which forms an extension of said stem means second passage.

9. The apparatus of claim 8 wherein said solenoid operated valve means comprises:
a solenoid affixed to said housing means;
a valve plunger operatively associated with said solenoid, said valve plunger extending through the valve seat of said vent passage defining means; and a spherical shaped valve member, said plunger urging said valve member against the valve seat at the second end of said poppet means with said solenoid in the deenergized condition and fluid pressure in said first passage urging said spherical shaped valve member against the valve seat of said vent passage defining means with said solenoid in the energized condition.

10. The apparatus of claim 9 wherein said biasing means comprises:
a spring disposed in said housing means bore.

* * * * *